US010408942B2

(12) United States Patent
Kim et al.

(10) Patent No.: US 10,408,942 B2
(45) Date of Patent: Sep. 10, 2019

(54) SYSTEMS AND METHODS TO DETECT GPS SPOOFING

(71) Applicant: THE BOEING COMPANY, Chicago, IL (US)

(72) Inventors: Geun Kim, Woodinville, WA (US); Gang Feng, Bellevue, WA (US); Tim Rohr, Seattle, WA (US); Susan Cheng, Seattle, WA (US)

(73) Assignee: The Boeing Company, Chicago, IL (US)

( * ) Notice: Subject to any disclaimer, the term of this patent is extended or adjusted under 35 U.S.C. 154(b) by 294 days.

(21) Appl. No.: 15/419,575

(22) Filed: Jan. 30, 2017

(65) Prior Publication Data
US 2018/0217266 A1    Aug. 2, 2018

(51) Int. Cl.
*G01S 19/21* (2010.01)
*G08G 5/00* (2006.01)
*G01S 19/39* (2010.01)
*G01S 13/93* (2006.01)
*G01S 5/00* (2006.01)
(Continued)

(52) U.S. Cl.
CPC ......... *G01S 19/215* (2013.01); *G01S 5/0072* (2013.01); *G01S 13/781* (2013.01); *G01S 13/86* (2013.01); *G01S 13/9303* (2013.01); *G01S 19/39* (2013.01); *G08G 5/0008* (2013.01); *G08G 5/0056* (2013.01); *G08G 5/0078* (2013.01)

(58) Field of Classification Search
CPC ..... G01S 19/215; G01S 19/31; G08G 5/0008; G08G 5/0056; G08G 5/0078

USPC .................................................... 342/357.59
See application file for complete search history.

(56) References Cited

U.S. PATENT DOCUMENTS

2006/0119515 A1* 6/2006 E. Smith ............... G01S 7/40
                                                  342/450
2008/0084283 A1* 4/2008 Kalik ................... B60Q 9/00
                                                  340/435

(Continued)

OTHER PUBLICATIONS

Axell, Erik, Erik G. Larsson, and Daniel Persson. "GNSS spoofing detection using multiple mobile COTS receivers." 2015 IEEE International Conference on Acoustics, Speech and Signal Processing (ICASSP). IEEE, 2015.

(Continued)

*Primary Examiner* — Harry K Liu
(74) *Attorney, Agent, or Firm* — Toler Law Group, PC

(57) ABSTRACT

A method of indicating whether a GPS signal received by a vehicle is accurate includes obtaining the GPS signal and calculating position information of the vehicle based on the GPS signal. The method further includes obtaining position information of another vehicle via a broadcast. The method further includes calculating a first distance information to the other vehicle based on the position information of the other vehicle and the position information of the vehicle. The method further includes obtaining a second distance information to the other vehicle via a collision avoidance system on the vehicle. The method further includes comparing the first distance information to the second distance information, and generating an indicator that the vehicle and the other vehicle may have received an inaccurate GPS signal when a result of the comparison is higher than a threshold.

20 Claims, 6 Drawing Sheets

(51) Int. Cl.
*G01S 13/78* (2006.01)
*G01S 13/86* (2006.01)

(56) References Cited

U.S. PATENT DOCUMENTS

| | | | |
|---|---|---|---|
| 2011/0287779 A1* | 11/2011 | Harper | G01S 19/03 |
| | | | 455/456.1 |
| 2014/0142838 A1* | 5/2014 | Durand | G08G 5/04 |
| | | | 701/301 |
| 2014/0327581 A1* | 11/2014 | Murphy | G01S 3/043 |
| | | | 342/417 |
| 2017/0031026 A1* | 2/2017 | Elliott | G01S 19/21 |
| 2018/0170573 A1* | 6/2018 | Wang | B64D 45/00 |
| 2018/0203130 A1* | 7/2018 | Neubecker | G01S 19/05 |
| 2018/0231972 A1* | 8/2018 | Woon | G05D 1/104 |
| 2018/0233054 A1* | 8/2018 | Woon | G08G 5/0013 |

OTHER PUBLICATIONS

Jovanovic, Aleksandar, Cyril Botteron, and Pierre-Andre Farine. "Multi-test detection and protection algorithm against spoofing attacks oh GNSS receivers." 2014 IEEE/ION Position, Location and Navigation Symposium-PLANS 2014. IEEE 2014.

Page, Lawrence, et al. "The PageRank citation ranking: bringing order to the web." (1999).

* cited by examiner

SYSTEMS AND METHODS TO DETECT GPS SPOOFING

BACKGROUND

Using Global Position System (GPS) satellite navigation is commonplace in modern vehicles. A GPS receiver in a vehicle can determine its position on the globe by receiving signals from at least four satellites whose positions are known with great precision. Based on these signals, the GPS receiver triangulates the vehicle position. Entities who wish to subvert a vehicle's navigation system can transmit spurious counterfeit GPS signals. If these spurious signals are received by a GPS receiver, the GPS receiver will calculate and report an incorrect position. Sending out counterfeit GPS signals is referred to as "GPS spoofing," and is becoming increasingly problematic, particularly in the field of aviation.

The existing solutions for detecting GPS spoofing include satellite signal encryption/authentication. Because this method requires Global Navigation Satellite System (GNSS) civil signal redesign, it could be costly and carries a potentially huge impact on existing GPS users. Another solution is statistical tests of GPS signal measurements including code measurement, carrier phase, signal power, and Doppler frequency. This method is subject to false alarms and missed detection due to normal signal variation and multipath environments. Also these GPS signal measurement data normally are not available at GPS receiver outputs. Another solution is a position consistency check with other position sensors, e.g., inertial reference system (IRS), radio positions based on distance measurement equipment (DME/DME) or very high frequency omnidirectional ranging (DME/VOR). This could be unreliable because of inherent IRS drift and the radio position is not always available.

SUMMARY

Various methods and apparatus described herein provide for simplified and improved GPS spoofing detection for GPS receivers in vehicles.

According to one embodiment, these advantages are achieved by a method of indicating whether a GPS signal received by a vehicle is accurate including obtaining the GPS signal and calculating position information of the vehicle based on the GPS signal. The method further includes obtaining position information of another vehicle via a broadcast (e.g., ADS-B). The method further includes calculating a first distance information to the other vehicle based on the position information of the other vehicle and the position information of the vehicle. The method further includes obtaining a second distance information to the other vehicle via a collision avoidance system (e.g., TCAS) on the vehicle. The method further includes comparing the first distance information to the second distance information, and generating an indicator that the vehicle and the other vehicle are suspected of receiving an inaccurate GPS signal when a result of the comparison is higher than a threshold.

In some embodiments, the vehicle and the other vehicle are airplanes. In some embodiments, the indicator is a link between the vehicle and the other vehicle, the link is stored in a matrix, and the matrix includes a list of probabilities for each of a plurality of vehicles, including the vehicle and the other vehicle, that each vehicle has received an inaccurate GPS signal. In some embodiments, the method further includes displaying the indicator to a user on a display, and accepting a user input that the vehicle has received an inaccurate GPS signal. In some embodiments, the method further includes exchanging indicator information with a third vehicle, and determining relative probabilities that the vehicle, the other vehicle, and the third vehicle has received an inaccurate GPS signal using a ranking equation.

An apparatus that indicates whether a GPS signal received by a vehicle is accurate includes a first interface configured to connect to a GPS receiver in the vehicle, a second interface configured to connect to a broadcast transceiver in the vehicle, and a third interface configured to connect to a collision avoidance device in the vehicle. The apparatus further includes a user interface and a storage device. The apparatus further includes a processor configured to obtain the GPS signal via the first interface, calculate position information of the vehicle based on the GPS signal, and obtain position information broadcast from another vehicle via the second interface. The processor is further configured to calculate a first distance information to the other vehicle based on the position information of the other vehicle and the position information of the vehicle, obtain a second distance information to the other vehicle from the collision avoidance system via the third interface, and compare the first distance information to the second distance information. The processor is further configured to generate an indicator that the vehicle and the other vehicle are suspected of receiving an inaccurate GPS signal when a result of the comparison is higher than a threshold.

In some embodiments, the vehicle and the other vehicle are airplanes. In some embodiments, the indicator is a link between the vehicle and the other vehicle, the link is stored in a matrix, and the matrix includes a list of probabilities for each of a plurality of vehicles, including the vehicle and the other vehicle, that each vehicle has received an inaccurate GPS signal. In some embodiments, the processor is further configured to display the indicator to a user on a display, and accept a user input that the vehicle has received an inaccurate GPS signal. In some embodiments, the processor is further configured to exchange indicator information with a third vehicle, and determine relative probabilities that the vehicle, the other vehicle, and the third vehicle has received an inaccurate GPS signal using a ranking equation.

A vehicle includes a GPS receiver, a broadcast transceiver, a collision avoidance device, a user interface, and a storage device. The vehicle further includes a processor configured to obtain the GPS signal from the GPS receiver, calculate position information of the vehicle based on the GPS signal, obtain position information broadcast from another vehicle from the broadcast transceiver, and calculate a first distance information to the other vehicle based on the position information of the other vehicle and the position information of the vehicle. The processor is further configured to obtain a second distance information to the other vehicle from the collision avoidance system, and compare the first distance information to the second distance information. The processor is further configured to generate an indicator that the vehicle and the other vehicle are suspected of receiving an inaccurate GPS signal when a result of the comparison is higher than a threshold.

In some embodiments, the vehicle and the other vehicle are airplanes. In some embodiments, the indicator is a link between the vehicle and the other vehicle, the link is stored in a matrix, and the matrix includes a list of probabilities for each of a plurality of vehicles, including the vehicle and the other vehicle, that each vehicle has received an inaccurate GPS signal. In some embodiments, the processor is further configured to display the indicator to a user on a display, and accept a user input that the vehicle has received an inaccurate GPS signal. In some embodiments, the processor is further configured to exchange indicator information with a third vehicle, and determine relative probabilities that the vehicle, the other vehicle, and the third vehicle has received an inaccurate GPS signal using a ranking equation.

DETAILED DESCRIPTION OF EMBODIMENTS

Figure 1:
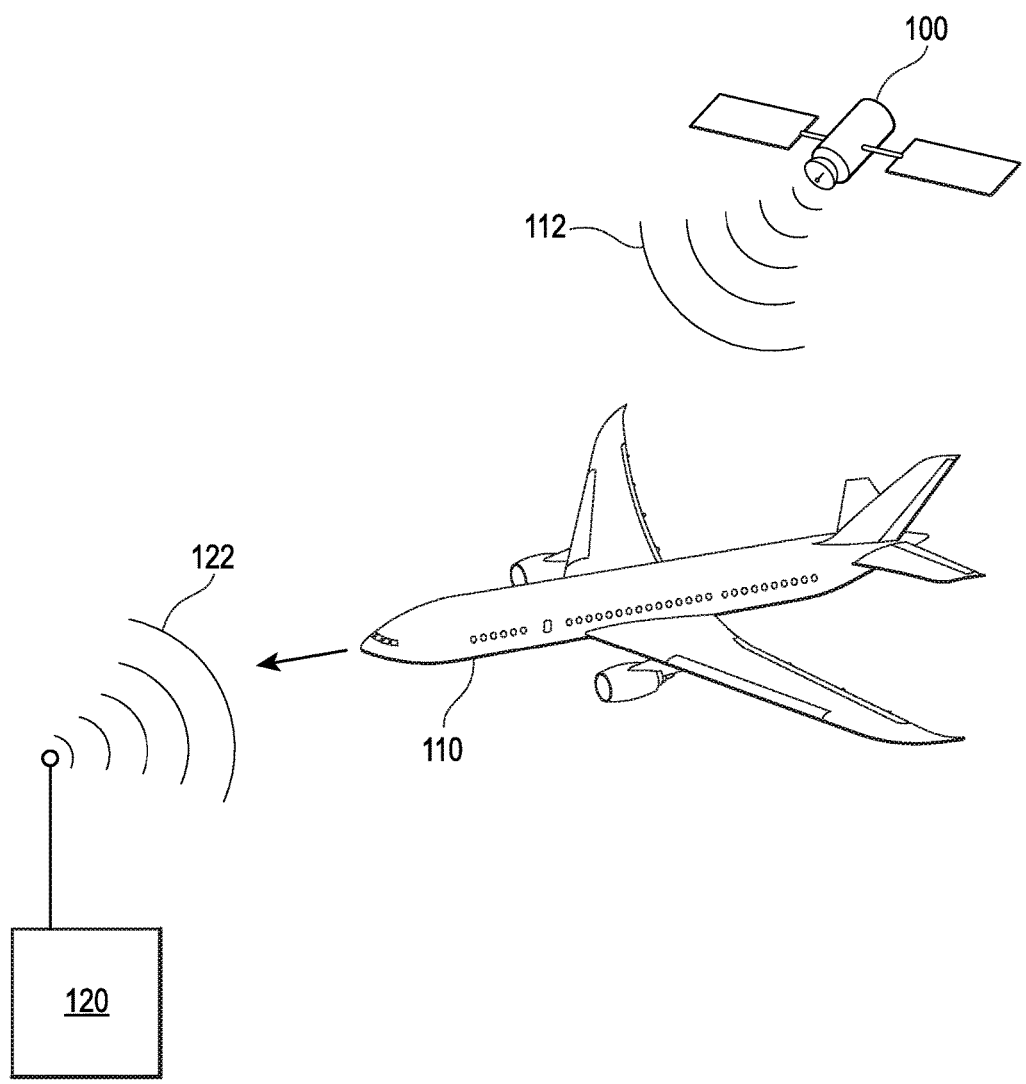
FIG. 1 is a diagram of an airplane flying from a region of normal GPS signal coverage into a region containing a GPS spoofing transmitter.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry, between software elements or between hardware and software implementations. Thus, for example, one or more of the functional blocks may be implemented in a single piece of hardware or multiple pieces of hardware. Similarly, the software programs may be stand-alone programs, may be incorporated as subroutines in an operating system, and the like. It should be understood that the various embodiments are not limited to the arrangements and instrumentality shown in the drawings.

Described herein are various methods and apparatus for detecting and indicating GPS spoofing or inaccurate GPS signals using the Automatic Dependent Surveillance-Broadcast (ADS-B) and Traffic Alert and Collision Avoidance System (TCAS) built into most aircraft. This system could also be used on other types of vehicles equipped with similar systems, such as cars, trucks, boats, and unmanned aerial vehicles (UAVs), as well as self-driving vehicles and aquatic or terrestrial drones. Thus, various embodiments may be employed, for example, in (i) aircraft equipped with GPS receivers and Automatic Dependent Surveillance-Broadcast (ADS-B), which sends and receives position data (e.g. derived from the GPS receiver) to other aircraft or (ii) aircraft equipped with Traffic Alert and Collision Avoidance System (TCAS), which uses radar or similar technology to determine the bearing and distance to nearby objects. In various embodiments, the GPS receiver, ADS-B, and TCAS are separate systems, but in these embodiments, the systems are configured to communicate with each other, and are used to detect GPS spoofing as described in more detail herein with reference to FIGS. 1-6.

FIG. 1 is a diagram of a vehicle, illustrated as an airplane 110 flying from a region of normal GPS signal coverage into a region containing a GPS spoofing transmitter 120. In the normal region illustrated on the right side of FIG. 1, a GPS receiver (not shown) inside airplane 110 is receiving normal GPS signal 112 from a GPS satellite 100. The GPS receiver inside the airplane 110 uses normal GPS signals 112 to triangulate the location of the airplane 110. As the airplane 110 moves into a transmitting range of GPS spoofing transmitter 120 illustrated on the left side of FIG. 1, the GPS receiver will begin to receive spurious signals 122. When the GPS receiver receives spurious signals 122, its triangulation calculation will be inaccurate, and the GPS receiver will report an incorrect position of the airplane 110 to users inside the airplane 110 (e.g., pilot within the airplane 110). According to the embodiments herein, the ADS-B and TCAS systems onboard the airplane 110 are used to verify the accuracy of the position reported by the GPS receiver, including to detect GPS spoofing.

Figure 2:
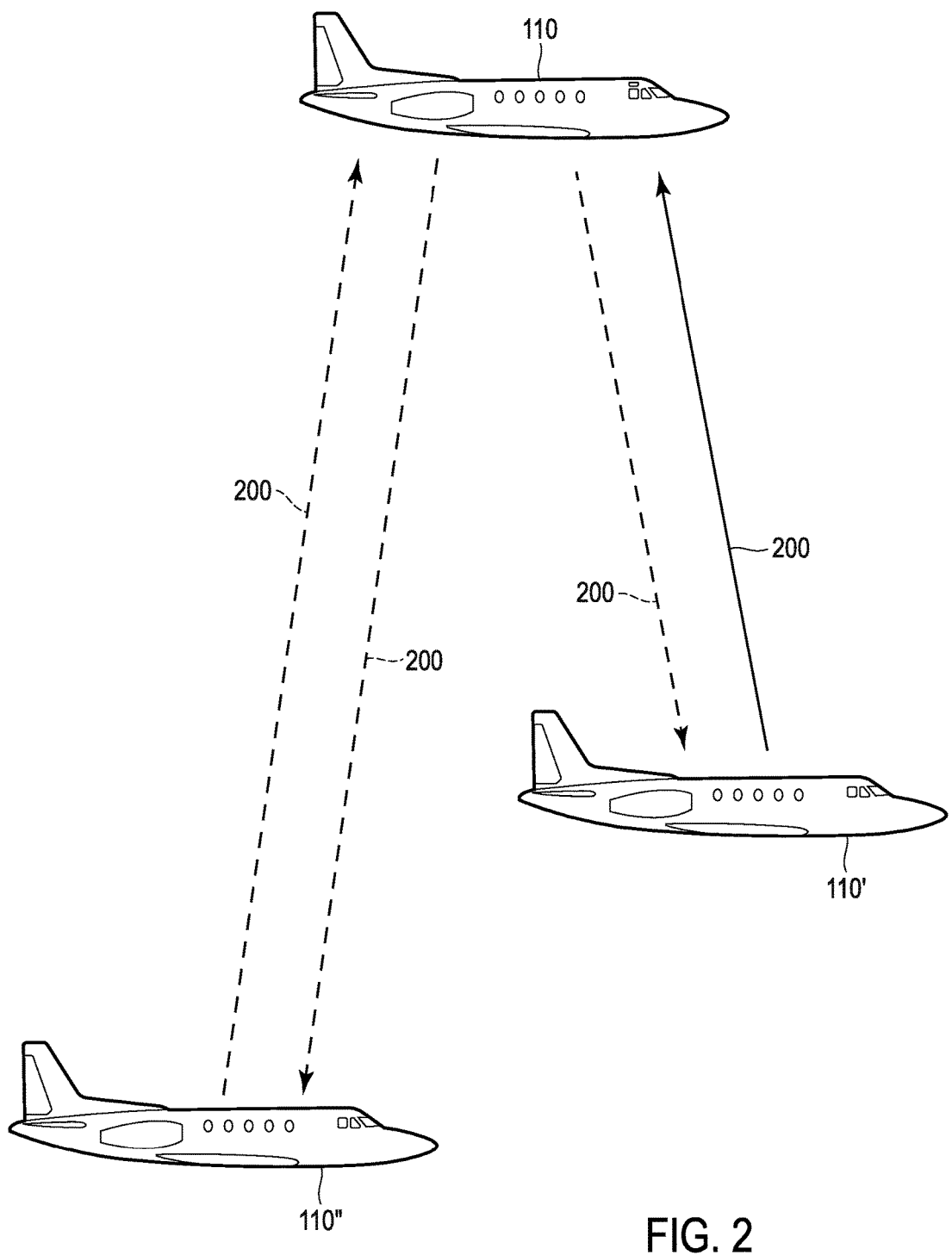
FIG. 2 is a diagram of airplanes communicating with each other according to one embodiment.

With respect to one operational example, FIG. 2 is a diagram of airplanes (110, 110', and 110") communicating with each other according to one embodiment. In some embodiments, the vehicle 110 and the other vehicle 110' are airplanes, however the various embodiments may be implemented in other air or flying vehicles, and land or water based vehicles.

FIG. 2 shows three airplanes 110, 110', 110" communicating in one embodiment. In some embodiments, an indicator is provided that is a link 200 between the vehicle 110 and at least the other vehicle 110', the link 200 is stored in a matrix, and the matrix includes a list of probabilities for each of the plurality of vehicles 110, 110', 110", including the vehicle 110' and the other vehicle 110', that each vehicle has received an inaccurate GPS signal. The link 200 could be an element of data stored on an electronic medium, or broadcast. The link 200 is a stored quantity of data that indicates that vehicle 110 and/or vehicle 110' is more likely to be a victim of GPS spoofing.

In various embodiments, the link is configured as a way to identify when one plane identifies another plane a possibly being affected or being affected by GPS spoofing. Thus, when a GPS spoofing detector 400 (shown in FIG. 4) of one plane identifies possible GPS spoofing affecting another airplane, and indicator within the system is provided that links these two planes. A link in various embodiments is any type of representation of what one airplane "thinks" about whether other airplanes are being affected by GPS spoofing. The direction of the link indicates the "point of view", meaning that if the link direction originates from airplane A to airplane B, then airplane A "thinks" that airplane B is being affected by GPS spoofing.

Figure 4:
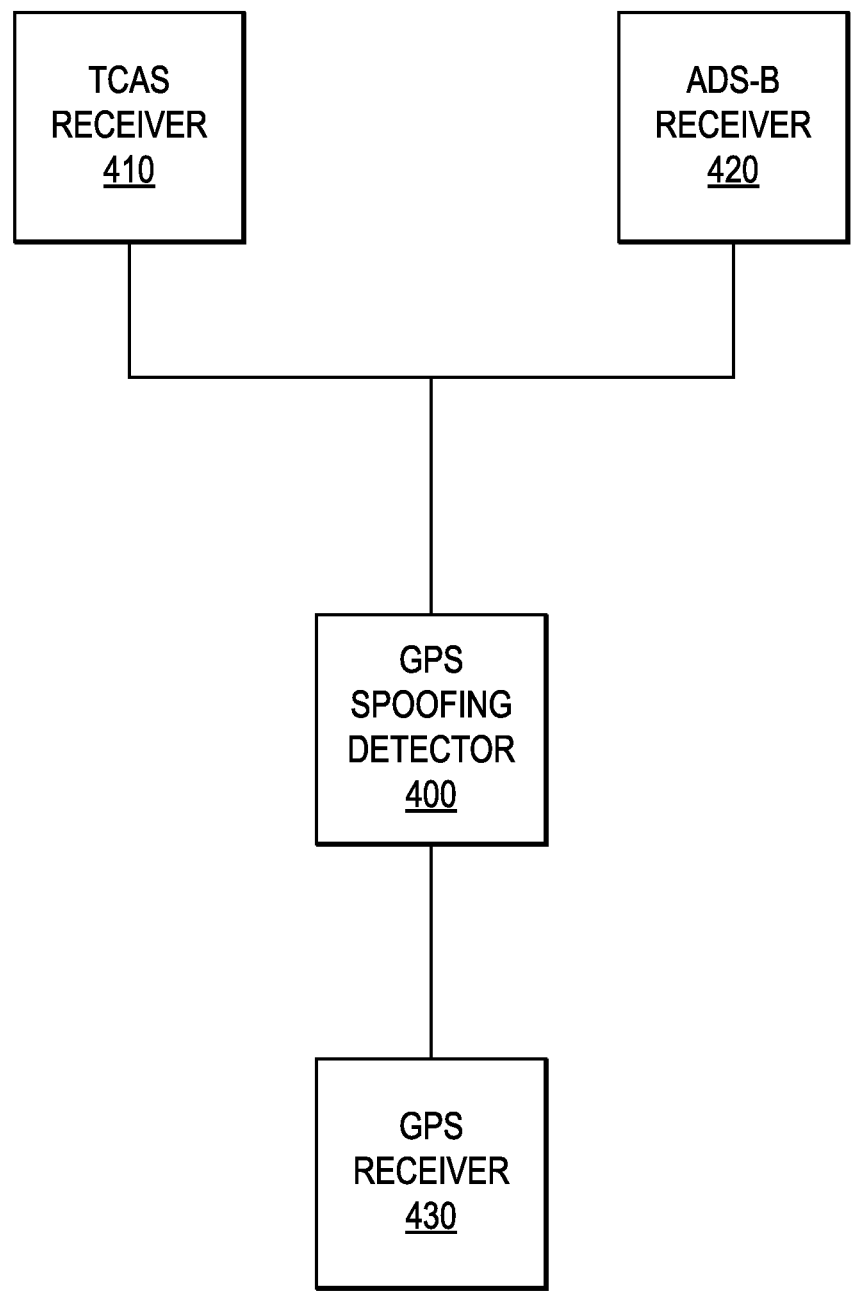
FIG. 4 is a block diagram of an apparatus according to one embodiment.

In various embodiments, the links are not physical or communicative links established between airplanes, but instead is defined by a set of computations made internally by one airplane (such as by the GPS spoofing detector 400 as described herein and shown in FIG. 4) on how each pair of nearby airplanes (including itself) is "linked". For example, in FIG. 2, the links are a representation of how all three airplanes 110, 110' and 110" should be "linked" from the perspective of airplane 110'. So, in the illustrated embodiment, all of these links were computed solely by airplane 110' (such as by the GPS spoofing detector 400 as described herein) based on the position and slant range data received from other airplanes via ADS=B In and TCAS. It should be noted that, for example, over time, all three airplanes 110, 110' and 110" compute and display their own version of how all airplanes 110, 110' and 110" should be linked. Based on these links, each airplane 110, 110' and 110" will have its own "Link Matrix" L as described herein.

Various vehicles 110, 110', 110", GPS spoofing detectors 400 (shown in FIG. 4) therein, and/or external systems, can read the link 200 and recognize the link 200 as indicating that vehicles 110, 110' are more likely to have been victim to GPS spoofing. The link 200 could be stored in a matrix or stored using some other data construct. Assume that all three airplanes 110, 110', and 110" have conducted the distance comparison described above, and that the airplane 110 is affected by GPS spoofing or otherwise has received an inaccurate GPS signal. In this scenario, the airplane 110" performs the following computations:

a. The airplane 110" computes the slant range to the airplane 110 (using ADS-B and local GPS) and compares it to the slant range received from the airplane 110 (using TCAS). The slant range difference exceeds the tolerance (due to the inaccurate GPS signal of airplane 110), therefore the airplane 110" adds a "link out" 200 (or indicator of likelihood of inaccurate GPS signal reception) to the airplane 110.

b. The airplane 110" computes the slant range to the airplane 110' and compares it to the slant range received from the airplane 110'. The slant range difference does not exceed the tolerance, and there is no link out 200 between the airplane 110" and the airplane 110'.

c. The airplane 110" accepts that the slant range difference to the airplane 110" computed by the airplane 110 will exceed the tolerance when compared to the slant range of the airplane 110" received by the airplane 110. Thus, the airplane 110 adds a link out 200 to the airplane 110".

d. The airplane 110" accepts that the slant range difference computed between the airplane 110 and the airplane 110' will also exceed the tolerance, and the airplane 110" adds a link out 200 between the airplane 110 and the airplane 110'.

Based on the computations in steps a-d above, the airplane 110" computes the following 3×3 link out matrix, L. Matrix L is initiated as a zero matrix, and the cells of matrix L are filled out based on the link out between the various vehicles (step 350).

$$L = \begin{bmatrix} 0 & 1 & 1 \\ 0.5 & 0 & 0 \\ 0.5 & 0 & 0 \end{bmatrix}$$

The columns in L represent link outs (links 200 out) from each airplane, and the summation for each column equals 1. In this example, the airplane 110 has link outs 200 to both the airplane 110' and the airplane 110". Therefore, the airplane 110 divides 1 by 2 (i.e. 0.5) and assigns the values to rows 2 and 3 of column 1 (which represents the airplane 110), corresponding to the planes 110' and the 110", respectively. Instead of both allocated 0.5, different weighting (e.g., 0.7 and 0.3) can be allocated to the airplane 110' and the airplane 110", in some embodiments, such as if it is known that certain airplane (e.g., the airplane 110') is more likely to have an erroneous position based on its location, distance, or other information. The airplane 110' only has the link out 200 to the airplane 110, thus its values are 1,0,0 for column 2 (which represents the airplane 110'), and the same is true for the airplane 110" which is represented by column 3.

After computing link matrix L, the airplane 110" computes a GPS spoofing Rank Vector R using the PageRank equation which may be performed. A background example may be found in Page, Lawrence, et al., "*The PageRank citation ranking: bringing order to the web.*" (1999). Some other ranking equation could be used. Various embodiments, including the apparatus, vehicle, and method, thus, further include, that the processor 400 is further configured to exchange indicator information with the third vehicle 110", and determine relative probabilities that the vehicle 110, the other vehicle 110', and the third vehicle 110" has received an inaccurate GPS signal using a PageRank equation, which in various embodiments allows the system to more accurately determine the relative probabilities that each vehicle in the plurality have been GPS spoofed. The PageRank equation has been used as a way to determine the importance of websites by the number of references to it on the web. A similar system is used in some embodiments to determine based on popularity which vehicles are most likely to have inaccurate GPS signals or spoofing. The PageRank analysis is used to calculate the GPS spoofing Rank Vector R using the following expressions (1)-(6).

$$R = \left[\frac{1}{N}\right]_{N \times 1} \tag{1}$$

where N is the number of total vehicles involved in the computation and $$\left[\frac{1}{N}\right]_{N \times 1}$$

is an N×1 vector with each element as 1/N. For example, in FIG. 2, R would be defined by the following expression (2).

$$R = \begin{bmatrix} \frac{1}{3} \\ \frac{1}{3} \\ \frac{1}{3} \end{bmatrix} \tag{2}$$

The PageRank equation is used as shown in expression (3).

$$R = \left(\beta L + (1-\beta) * \left[\frac{1}{N}\right]_{N \times N}\right) * R \tag{3}$$

Where β is a random link probability (which can be set to 0.8 as default) and $$\left[\frac{1}{N}\right]_{N \times N}$$

is an N×N matrix with 1/N as each element. For example, in FIG. 2, this would be defined as the following expression (4).

$$\left[\frac{1}{3}\right]_{3 \times 3} = \begin{bmatrix} \frac{1}{3} & \frac{1}{3} & \frac{1}{3} \\ \frac{1}{3} & \frac{1}{3} & \frac{1}{3} \\ \frac{1}{3} & \frac{1}{3} & \frac{1}{3} \end{bmatrix} \tag{4}$$

The PageRank equation is repeated until R converges. For example, for the FIG. 2 example, R converges to the following expression (5).

$$\begin{bmatrix} 0.4815 \\ 0.2593 \\ 0.2593 \end{bmatrix} \quad (5)$$

The GPS spoofing Rank Vector S is calculated using the following expression (6).

$$S = R*N = \begin{bmatrix} 1.4445 \\ 0.7779 \\ 0.7779 \end{bmatrix} \quad (6)$$

Each value of S is alternately referred to as the GPS spoofing Rank (SRank). By observing the highest value in the vector S, the airplane 110" identifies the airplane that is most likely to be spoofed. In this case, the airplane 110 has the highest value of 1.4445. Thus, the airplane 110 is the most likely to be spoofed. In some embodiments, the SRanks and matrices representing probabilities that a group of aircraft have received inaccurate GPS signals are stored in a memory, such as a storage device 640 (shown in FIG. 6). This information can also be shared between the vehicles 110, via various communication systems onboard the vehicles 110. This information can also be uploaded to or downloaded from a server or hub separated from the vehicles 110. It should be noted that other ranking schemes may be used as needed or desired.

Figure 3:
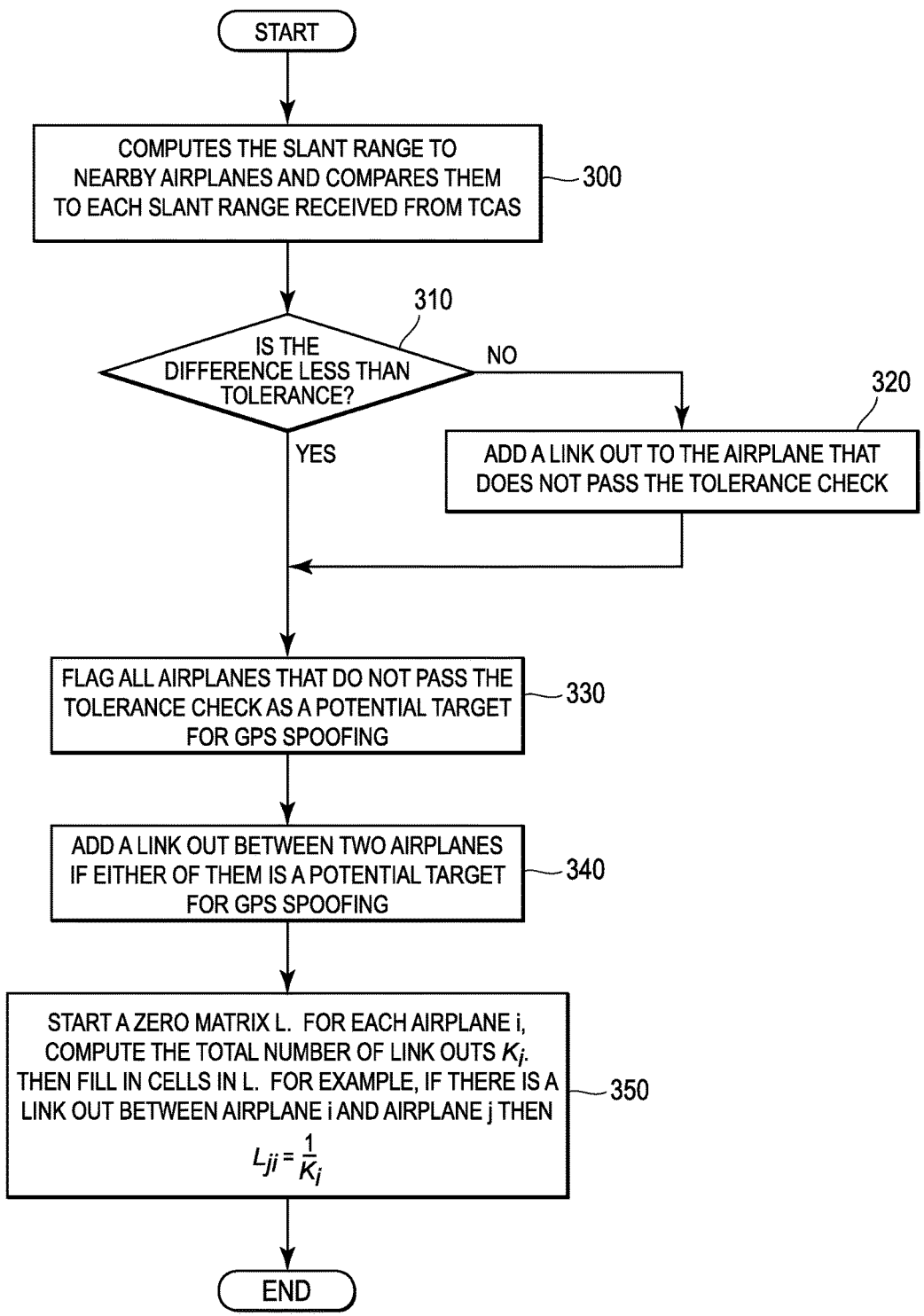
FIG. 3 is a flowchart of a method according to one embodiment.

According to one embodiment of a method as shown in FIG. 3, after the ADS-B data is obtained by the first airplane 110 from the second airplane 110', the slant range between the airplane 110 and the airplane 110' is calculated (step 300). The slant range is an absolute distance including a difference in altitude. First, the GPS position information for the airplane 110 is obtained from the GPS receiver 430 (shown in FIG. 4, which in some embodiments is a local GPS receiver), then the latitude, longitude and height (LLH) data is obtained for the airplane 110' via the ADS-B receiver 420. The LLH data from the GPS receiver 430 and the ADS-B receiver 420 are converted to Earth-Centered, Earth-Fixed (ECEF) X, Y, Z coordinates in order to accurately calculated relative distances. This calculation is performed using the following expression (7).

$$\tilde{P}_{i,e}[x_{i,e} y_{i,e} z_{i,e}] \text{ and } \tilde{P}_{j,e}[x_{j,e} y_{j,e} z_{j,e}] \quad (7)$$

Once ECEF position data is obtained for both of the planes 110 and 110', the slant range can be calculated using the following expression (8).

$$\rho_{ij} = \sqrt{(x_{i,e}-x_{j,e})^2 (y_{i,e}-y_{j,e})^2 + (z_{i,e}-z_{j,e})^2} \quad (8)$$

The data from the TCAS receiver 410 is already in slant range format and can be directly compared with the slant range calculated using expression (8) using the following expression (9).

$$\Delta \rho_{ij} = \rho_{ij} - \rho_{ij,e} \quad (9)$$

The range difference $\Delta \rho_{ij}$ tolerance with a TCAS error of 50 ft RMS (1-sigma value) and the 250 ft bias for a false alert probability of $1 \cdot e^{-5}$, the threshold T is defined by expression (10). In other words, it is determined whether or not the range difference is less than a tolerance T (step 310).

$$T = 250 + 4.42 \times 50 = 471 \text{ ft} \quad (10)$$

Accordingly, in some embodiments, the threshold for an acceptable deviation between the GPS position reported by the GPS receiver 430 (shown in FIG. 4) and the calculated position based on the ADS-B and TCAS data is 471 ft (however, other values may be used). In other words, if the difference exceeds 471 ft, a determination is made that both of the vehicles (or airplanes) 110 or 110' are more likely to have received (or are suspected of receiving) an inaccurate GPS position. When the range difference is less than tolerance T, a link is added to the vehicles (step 320). The link 200 is a stored quantity of data that indicates that vehicle 110 and/or vehicle 110' is more likely to be a victim of GPS spoofing. Various vehicles 110, 110', 110", GPS spoofing detectors 400 therein, and/or external systems, can read the link 200 and recognize the link 200 as indicating that vehicles 110, 110' are more likely to have been victim to GPS spoofing. Without another frame of comparison, it is difficult to determine which vehicle has inaccurate GPS position data. Accordingly, both vehicles are considered more likely to have received a spurious GPS signal, or have been the victim of GPS spoofing. Therefore, all vehicles that do not pass the tolerance check are flagged as potential targets for GPS spoofing (step 330), and a link (or link out) is between the two vehicles is added (step 340). A matrix is filled out based on the link out between the various vehicles (step 350), discussed in more detail below after computational steps a-d.

Thus, various embodiments include a method of indicating whether a GPS signal received by a vehicle 110 is accurate includes obtaining the GPS signal and calculating position information of the vehicle 110 based on the GPS signal. The method further includes obtaining position information of the other vehicle 110' via a broadcast. The method further includes calculating a first distance information to the other vehicle 110' based on the position information of the other vehicle 110' and the position information of the vehicle 110 (as described herein as step 300). The method further includes obtaining a second distance information to the other vehicle 110' via the collision avoidance system on the vehicle 110, such as the TCAS receiver 410 (as described herein as step 300). The method further includes comparing the first distance information to the second distance information (as described herein as step 300), and generating an indicator that the vehicle 110 and the other vehicle 110' are suspected of receiving an inaccurate GPS signal when a result of the comparison is higher than a threshold (as described herein as steps 310-340).

FIG. 4 is a block diagram of an apparatus according to one embodiment. In this diagram, the GPS spoofing detector 400 is connected to the TCAS receiver 410, a broadcast transceiver (illustrated as an ADS-B receiver 420), and a GPS receiver 430 of the vehicle (e.g. airplane 110). The interconnection of the various component illustrated in FIG. 4 may be provided using one or more wired connections, one or more wireless connections, or a combination thereof. As described in more detail herein, the GPS spoofing detector 400 uses signals from one or more of these devices to check the accuracy of the position reported by the GPS receiver 430, to thereby detect GPS spoofing.

Figure 5:
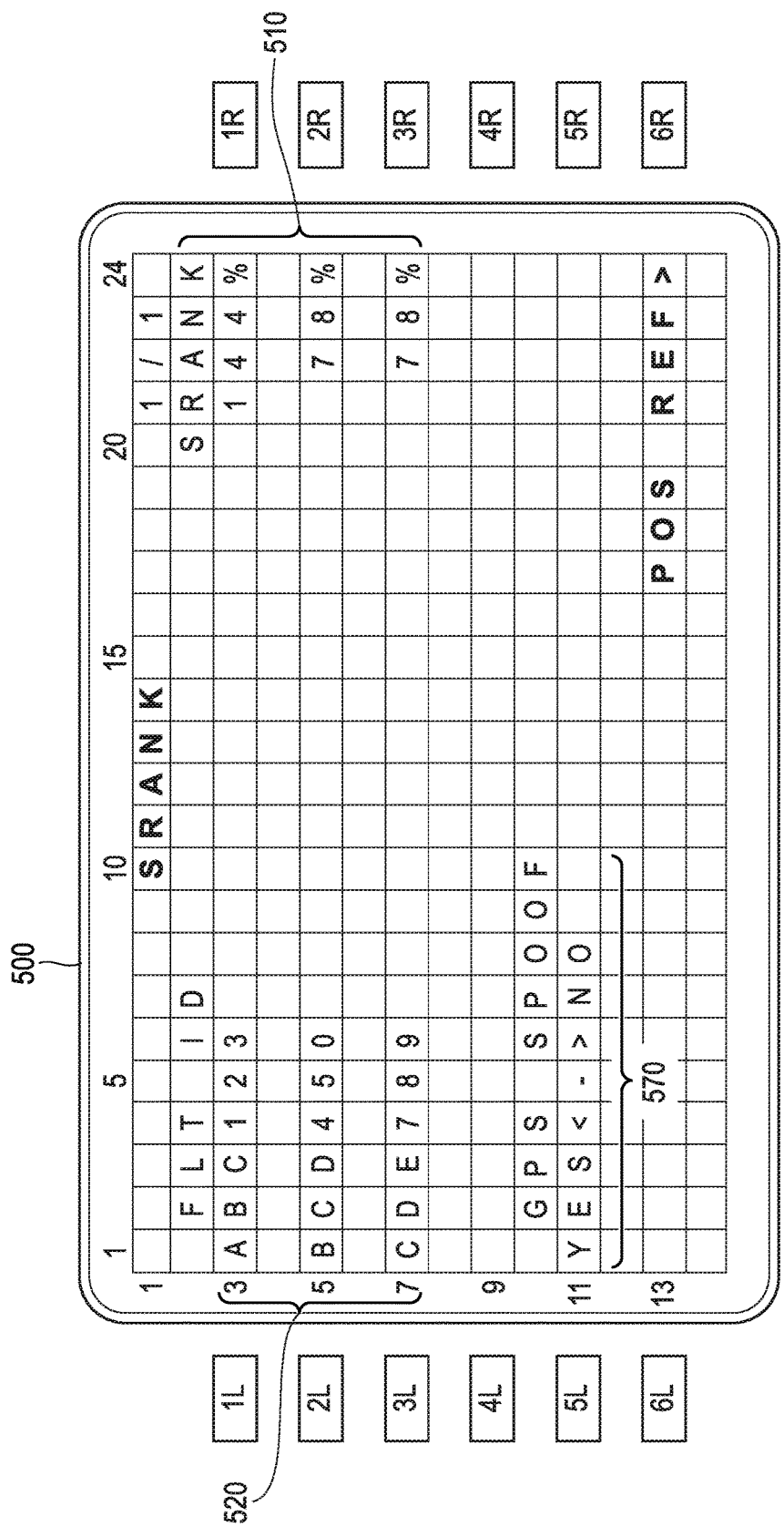
FIG. 5 is an illustration of a display readout employing a method and apparatus according to one embodiment.
Figure 6:
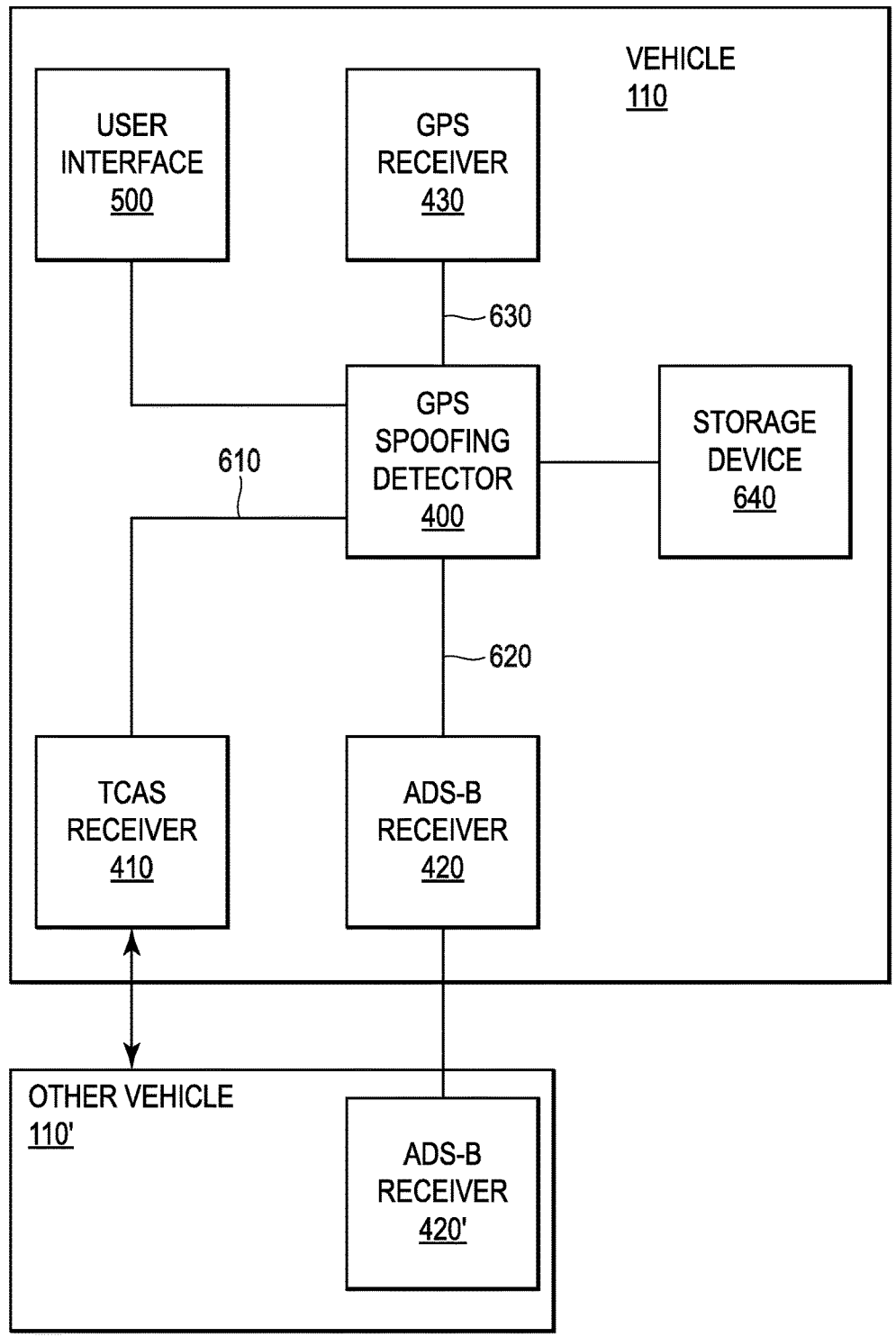
FIG. 6 is a block diagram of two nearby vehicles according to one embodiment.

FIGS. 4 and 6 include an apparatus (such as a processor configured to act as a GPS spoofing detector 400) in various embodiments that indicates whether a GPS signal received by the vehicle 110 is accurate (e.g., to detect GPS spoofing) includes interfaces to the GPS spoofing detector 400, including a first interface 630 (see FIG. 6) configured to connect to the GPS receiver 430 in the vehicle 110, a second interface 620 (see FIG. 6) configured to connect to the broadcast transceiver 420 in the vehicle 110, and a third interface 610 (see FIG. 6) configured to connect to the collision avoidance device 410 in the vehicle 110. In some embodiments, the apparatus (or GPS spoofing detector 400) further includes a user interface 500 (see FIG. 5) and a storage device 640 (see FIG. 6), such as any suitable memory device. The apparatus further includes a processor 400 (illustrated as a GPS spoofing detector) configured to obtain the GPS signal via the first interface 630, calculate position information of the vehicle based on the GPS signal, and obtain position information broadcast from another vehicle 110' via the second interface 620 as discussed herein. The processor 400 is further configured to calculate a first distance information to the other vehicle 110' based on the position information of the other vehicle 110' and the position information of the vehicle 110, obtain a second distance information to the other vehicle 110' from the collision avoidance system 410 via the third interface 610, and compare the first distance information to the second distance information. The processor 400 is further configured to generate an indicator that the vehicle 110 and the other vehicle 110' are suspected of receiving an inaccurate GPS signal when a result of the comparison is higher than a threshold, thereby detecting GPS spoofing.

In various embodiments, and with reference more particularly to FIG. 5, the information determined as described above can be displayed to a user of the aircraft at portions 510 and 520. In this embodiment, the processor 400 is configured to display the indicator 510, 520 to a user on the display 500, and accept a user input that the vehicle has received an inaccurate GPS signal. In this embodiment, the display 500 has an input option for a user inputting a determination that the airplane is being spoofed. The display (or user interface) 500 is a touchscreen in some embodiments, and includes an input 570 which allows a user to indicate to the spoofing detector 400 that the vehicle 110 is likely being spoofed. The input 570 can be used to enhance the efficacy of the GPS spoofing detector 400 in situations where a user is aware of spoofing and the algorithm does not detect it. In other embodiments, the GPS spoofing detector 400 indicates to the user which nearby vehicles are spoofed by displaying an indicator such a question mark in association with suspected spoofed vehicles on a radar display. However, other visual, audible or tactile indicators may be used.

With reference more particularly to FIG. 6, a diagram of the vehicle or airplane 110 and another vehicle 110', such as a nearby vehicle, is illustrated. The GPS spoofing detector 400 is connected via the interface 630 to the vehicle's GPS receiver 430, the interface 620 to the vehicle's ADS-B receiver 420, and the interface 610 to the vehicle's TCAS receiver 410. Interfaces 610, 620, and 630 can be any type of wired or wireless communication structure that enables communication between the GPS spoofing detector (or processor) 400 and the various components of the vehicle 110. The GPS spoofing detector 400 is also connected to the user interface 500 and storage device 640 in the vehicle 110, which can be components of the vehicle, or components of a GPS spoofing detector module or retrofit kit, depending on the embodiment. Moreover, the GPS spoofing detector 400 itself or components thereof can be integrated into the vehicle 110, retrofit, or outside of the vehicle 110 and connected thereto via a network or other communication system, depending on the embodiment.

The vehicle 110 includes the GPS receiver 430, the broadcast transceiver, configured as the ADS-B receiver 420, the vehicle's TCAS receiver 410 being a collision avoidance device, the user interface 500, and a storage device 640. The vehicle 110 further includes a processor configured as the GPS spoof detector 400 to obtain the OPS signal from the GPS receiver 430, calculate position information of the vehicle 110 based on the GPS signal, obtain position information broadcast from another vehicle 110' from the ADS-B receiver 420, and calculate a first distance information to the other vehicle 110' based on the position information of the other vehicle 110' and the position information of the vehicle 110. The processor 400 is further configured to obtain a second distance information to the other vehicle 110' from the collision avoidance system, and compare the first distance information to the second distance information. The processor 400 is further configured to generate an indicator that the vehicle 110 and the other vehicle 110' are suspected of receiving an inaccurate GPS signal when a result of the comparison is higher than a threshold.

The GPS spoofing detector 400, in several embodiments, includes or is embodied as one or more processors or CPU executing software on a non-transitory storage medium (e.g. memory). The processor or CPU can execute steps of the methods described herein. The storage device 640 can contain any type of storage such as solid-state memory, flash memory, RAM, cloud storage, or a hard disk. The storage device 640 stores the links or indicators of spoofing, which will be discussed further below.

In some embodiments, the ADS-B receiver (or transceiver) 420 receives data from nearby aircraft at a rate of 2 Hz. This data includes latitude, longitude, and Global Navigation Satellite System (GNSS) height (typically derived from a GPS receiver on the nearby aircraft), baro-altitude, aircraft identification, navigation integrity category (NIC), cardinal direction and vertical velocities, and navigation accuracy category for velocity (NACv). The TCAS receiver 410 generates data at a rate of 1 Hz relating to nearby aircraft. This data includes aircraft identification, slant range (error of 50 foot (ft) (root-mean-square [RMS]) and 250 ft bias), bearing (with error less than 9 degrees (RMS), 27 degrees peak from −10 degrees to +10 degrees elevation, and less than 15 degrees (RMS), 45 degrees peak from +10 to +20 degrees elevation), and relative altitude with 100 ft resolution. These data resolution, update ranges, and errors may improve in future versions of ADS-B and TCAS, or similar technologies. In some embodiments, the ADS-B receiver 420 in the first vehicle 110 receives ADS-B data from an ADS-B receiver (or transceiver) 420' in the nearby vehicle 110', as shown in FIG. 6.

Thus, various embodiments provide systems and methods for detecting GPS spoofing.

Although the invention has been described with reference to embodiments herein, those embodiments do not limit the scope of the invention. Modifications to those embodiments or different embodiments may fall within the scope of the invention.

It should be noted that the various embodiments may be implemented in hardware, software or a combination thereof. The various embodiments and/or components, for example, the modules, or components and controllers therein, also may be implemented as part of one or more computers or processors or field-programmable gate arrays (FPGAs). The computer or processor or FPGA may include a computing device, an input device, a display unit and an interface, for example, for accessing the Internet. The computer or processor may include a microprocessor. The microprocessor may be connected to a communication bus. The computer or processor or FPGA may also include a memory. The memory may include Random Access Memory (RAM) and Read Only Memory (ROM). The computer or processor or FPGA further may include a storage device, which may be a hard disk drive or a removable storage drive such as an optical disk drive, and the like. The storage device may also be other similar means for loading computer programs or other instructions into the computer or processor.

As used herein, the terms "system," "subsystem," "circuit," "component," or "module" may include a hardware and/or software system that operates to perform one or more functions. For example, a module, circuit, component, or system may include a computer processor, controller, or other logic-based device that performs operations based on instructions stored on a tangible and non-transitory computer readable storage medium, such as a computer memory. Alternatively, a module, circuit, component, or system may include a hard-wired device that performs operations based on hard-wired logic of the device. The modules or circuits or components shown in the attached figures may represent the hardware that operates based on software or hardwired instructions, the software that directs hardware to perform the operations, or a combination thereof.

The block diagrams of embodiments herein illustrate various blocks labeled "circuit" or "module." It is to be understood that the circuits or modules may be implemented as hardware with associated instructions (e.g., software stored on a tangible and non-transitory computer readable storage medium, such as a computer hard drive, ROM, RAM, or the like) that perform the operations described herein. The hardware may include state machine circuitry hard wired to perform the functions described herein. Optionally, the hardware may include electronic circuits that include and/or are connected to one or more logic-based devices, such as microprocessors, processors, controllers, or the like. Optionally, the modules may represent processing circuitry such as one or more FPGAs, application specific integrated circuit (ASIC), or microprocessor. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method of indicating whether a Global Position System (GPS) signal received by a vehicle is accurate, the method comprising:
   receiving the GPS signal;
   calculating first position information of the vehicle based on the GPS signal;
   receiving second position information of a second vehicle via a broadcast;
   calculating a first distance to the second vehicle based on the first position information and the second position information;
   receiving a second distance to the second vehicle from a collision avoidance system on the vehicle;
   comparing the first distance to the second distance to generate a difference;
   generating an indicator that the vehicle and the second vehicle are suspected of receiving an inaccurate GPS signal responsive to the difference being greater than a threshold;
   exchanging indicator information with a third vehicle; and
   determining relative probabilities that the vehicle, the second vehicle, and the third vehicle have received inaccurate GPS signals.

2. The method of claim 1, wherein the vehicle and the second vehicle are airplanes.

3. The method of claim 1, wherein the relative probabilities are determined using a ranking equation.

4. The method of claim 1, further comprising storing data corresponding to the indicator in a matrix, wherein the matrix comprises the indicator information.

5. The method of claim 1, further comprising storing the relative probabilities in a matrix, wherein the matrix includes a list of probabilities for each of a plurality of vehicles, including the vehicle, the second vehicle, and the third vehicle, the list of probabilities including a probability that each vehicle has received an inaccurate GPS signal.

6. The method of claim 1, further comprising displaying a visual representation of the indicator on a display.

7. The method of claim 1, wherein the collision avoidance system uses radar.

8. An apparatus that indicates whether a GPS signal received by a vehicle is accurate, the apparatus comprising:
a storage device; and
a processor configured to perform operations comprising:
receiving the GPS signal;
calculating first position information of the vehicle based on the GPS signal;
receiving second position information of a second vehicle;
calculating a first distance to the second vehicle based on the first position information and the second position information;
receiving a second distance to the second vehicle from a collision avoidance device;
comparing the first distance to the second distance to generate a difference;
generating an indicator that the vehicle and the second vehicle are suspected of receiving an inaccurate GPS signal responsive to the difference being greater than a threshold;
exchanging indicator information with a third vehicle; and
determining relative probabilities that the vehicle, the second vehicle, and the third vehicle have received inaccurate GPS signals.

9. The apparatus of claim 8, wherein the vehicle and the second vehicle are airplanes.

10. The apparatus of claim 8, wherein the relative probabilities are determined using a ranking equation.

11. The apparatus of claim 8, further comprising storing data corresponding to the indicator in a matrix, wherein the matrix comprises the indicator information.

12. The apparatus of claim 8, wherein the operations further comprise storing the relative probabilities in a matrix, wherein the matrix includes a list of probabilities for each of a plurality of vehicles, including the vehicle, the second vehicle, and the third vehicle, the list of probabilities including a probability that each vehicle has received an inaccurate GPS signal.

13. The apparatus of claim 8, wherein the operations further comprise displaying a visual representation of the indicator on a display.

14. The apparatus of claim 8, wherein the collision avoidance device uses radar.

15. A vehicle comprising:
a GPS receiver;
a broadcast transceiver;
a collision avoidance device;
a storage device; and
a processor configured to perform operations comprising:
receiving a GPS signal from the GPS receiver;
calculating first position information of the vehicle based on the GPS signal;
receiving second position information for a second vehicle from the broadcast transceiver;
calculating a first distance to the second vehicle based on the first position information and the second position information;
receiving a second distance to the second vehicle from the collision avoidance device;
comparing the first distance to the second distance to generate a difference; and
generating an indicator that the vehicle and the second vehicle are suspected of receiving an inaccurate GPS signal responsive to the difference being greater than a threshold;
exchanging indicator information with a third vehicle; and
determining relative probabilities that the vehicle, the second vehicle, and the third vehicle have received inaccurate GPS signals.

16. The vehicle of claim 15, wherein the vehicle and the second vehicle are airplanes.

17. The vehicle of claim 15, wherein the relative probabilities are determined using a ranking equation.

18. The vehicle of claim 15, wherein the operations further comprise storing the relative probabilities in a matrix, wherein the matrix includes a list of probabilities for each of a plurality of vehicles, including the vehicle, the second vehicle, and the third vehicle, the list of probabilities including a probability that each vehicle has received an inaccurate GPS signal.

19. The vehicle of claim 15, wherein the operations further comprise displaying a visual representation of the indicator on a display.

20. The vehicle of claim 15, wherein the collision avoidance device includes a radar system.

* * * * *